UNITED STATES PATENT OFFICE.

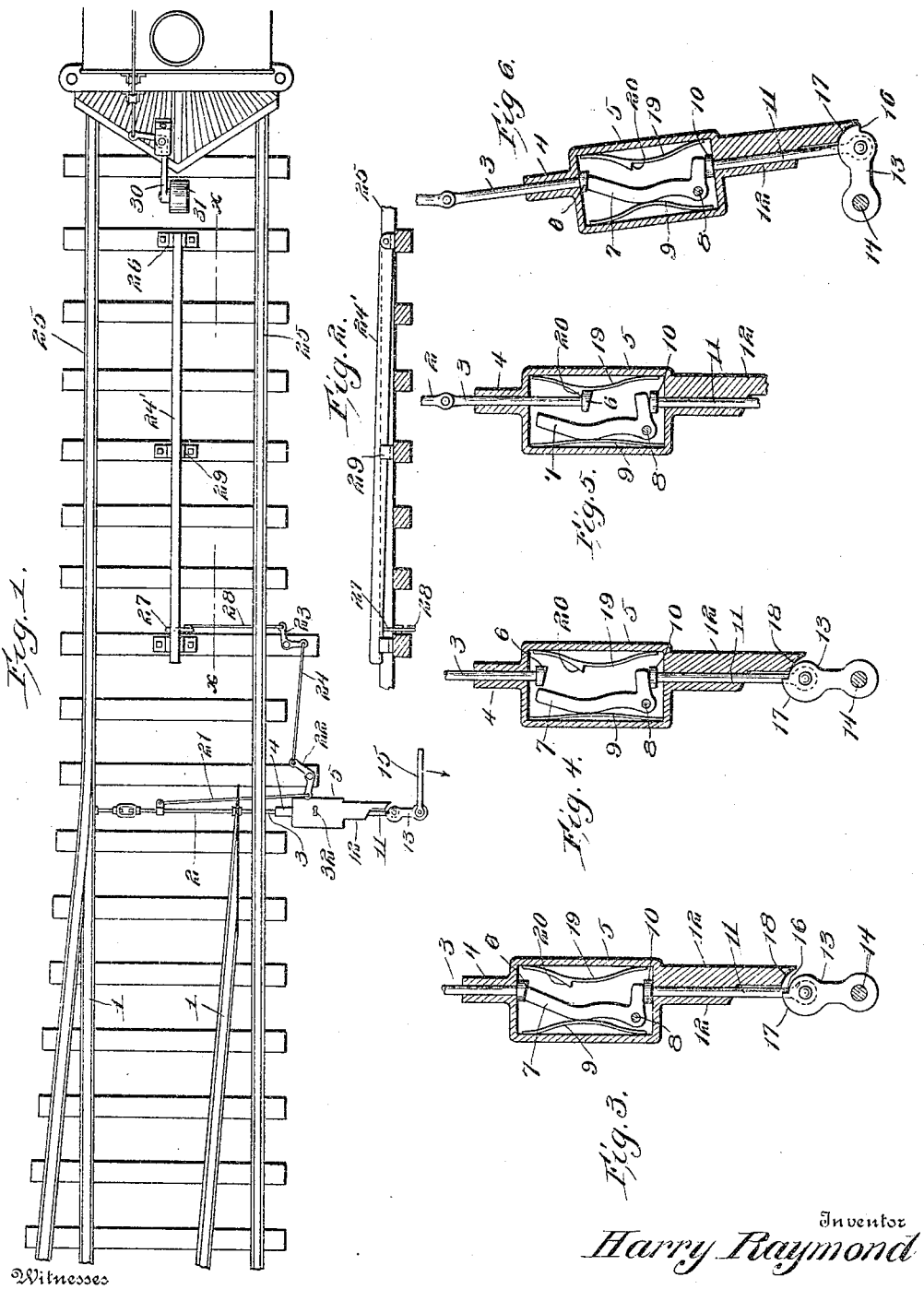

HARRY RAYMOND, OF KENOSHA, WISCONSIN.

RAILWAY-SWITCH.

No. 816,254.  Specification of Letters Patent.  Patented March 27, 1906.

Application filed November 28, 1905. Serial No. 289,436.

*To all whom it may concern:*

Be it known that I, HARRY RAYMOND, a citizen of the United States, residing at Kenosha, in the county of Kenosha and State of Wisconsin, have invented certain new and useful Improvements in Railway-Switches; and I do hereby declare the following to be a full, clear, and exact description of the invention, such as will enable others skilled in the art to which it appertains to make and use the same.

My invention relates to railway-switches; and its object is to provide mechanism whereby a switch may be automatically shifted if improperly set and whereby said switch will be automatically locked as soon as shifted in this manner.

The invention is particularly adapted for automatically closing switches which have been carelessly left open, the closing mechanism being actuated by means upon the locomotive approaching the switch.

The invention consists of a slidable casing having oppositely-disposed headed rods slidably mounted within it and held normally spaced apart by a spring-pressed locking-lever. The casing is connected to the switch by a rod, and said switch is also connected, by means of suitable power-transmitting devices, with an actuating bar or rail, which is mounted between the rails of the track at a point ahead of the switch and is adapted to be contacted and depressed by suitable means upon a locomotive.

Means may be provided for manually shifting the casing and the rods connected thereto so as to actuate the switch and the rods and locking-lever, and the rods are so disposed in relation to each other that if the switch is left open the said rods and lever can be operated by an approaching locomotive so as to shift the switch into closed position, even though the ordinary locking mechanism remains unchanged.

The invention also consists in providing means for automatically locking the switch after the same has been automatically shifted.

The invention also consists of the further novel features of construction and combination of parts the preferred form whereof will be hereinafter more clearly set forth, and pointed out in the claims.

In said accompanying drawings I have shown the preferred forms of my invention. In the drawings, Figure 1 is a plan view of a switch embodying my improvements and also showing a portion of a locomotive having mechanism thereon for actuating the switch. Fig. 2 is a section on line $x\ x$, Fig. 1. Fig. 3 is a horizontal section through the casing and the mechanism for automatically releasing and locking the switch. Fig. 4 is a similar view showing the positions of the parts at the beginning of the automatic shifting of the switch from open to closed position. Fig. 5 shows the manner of automatically locking the switch when closed in this manner, and Fig. 6 shows the positions assumed by the parts immediately subsequent to the manual resetting of the parts and prior to the return of the parts to the positions shown in Figs. 1 and 3.

Referring to the figures by numerals of reference, 1 1 are movable switch-rails connected by a rod 2, to which is pivotally secured a stem 3, which is slidably mounted within a sleeve 4, extending from one end of a casing 5. This stem has a head 6 on its inner end, which is beveled and normally contacts with one end of a bell-crank locking-lever 7, which is pivoted within the casing, as shown at 8, and is held by means of a spring 9 with one end normally in the path of head 6. The other end of said lever is held by the spring 9 against a head 10, formed at one end of a stem 11, which is slidably mounted within an arm 12, extending from the other end of the casing, and this stem is pivoted to an arm 13, extending from a rotatable rod 14, adapted to be manually operated by a handle 15, which may be locked in any preferred manner. That end of arm 13 to which stem 11 is pivoted is curved and concentric with the pivot of said stem, and a shoulder 16 is formed upon the periphery of said end along the longitudinal center of said arm, and the periphery of said end describes an arc 17, which extends from said shoulder and is concentric with the pivot of stem 11, the radius of said arc being greater than that of the remaining portion of the end of arm 13. The end of arm 12 is concave, as shown at 18, and when the parts are in their normal positions, as shown in Fig. 1, a space is formed between said concave end and the small half of the pivoted end of arm 13, said space being equal to the depth of the shoulder 16. A bow-spring 19 is mounted within the casing 5 and has a shoulder 20, which lies in the path of head 6.

A rod 21 connects rod 2 with a bell-crank lever 22, and this lever is connected to another bell-crank lever 23 by means of a rod 24. An actuating-rail 24' is disposed between and parallel with the rails 25 of the track in front of the switch 1, and this actuating-rail is pivoted at one end between ears 26, while its other end is supported upon the upper horizontal arm of a bell-crank lever 27, the lower arm of which is connected to bell-crank lever 23 by a rod 28. Guide-ears 29 are disposed in pairs at suitable distances along the actuating-rail 24'.

Where apparatus such as herein described is employed, switch-rails 1 1 can be shifted laterally by swinging the handle 15 in the direction of the arrow in Fig. 1, so as to cause arm 13 to pull on the stem 11, and the head 10 of said stem will in turn bear against one end of casing 5 and cause the casing to pull on the head 6 and actuate stem 3 and rod 2. During this movement the enlarged portion of the end of arm 13 will move into the recessed or concave end 18 of the arm 12 and the parts will all assume the positions shown in Fig. 6. When in this position, the rails 1 1 will have been shifted toward the casing 5. It will of course be understood that the handle 15 can be locked in any desired manner. Should it be desired to shift the rails in the opposite direction, the movement of the handle 15 is reversed and the periphery of the notched portion 17 of arm 13 will bear against arm 12 and force the casing toward the rails 25, and the locking-lever 7 being interposed between the stems 3 and 11 will cause the stem 3 to shift the rails 1 1 away from the casing 5 and into the positions shown in Fig. 1. The handle 15 can be locked by any suitable means after assuming this position; but if it is undesirable to leave the rails in the position shown in Fig. 1, but the same should be locked in such position, they will be automatically shifted by a locomotive, because of the peculiar mechanism provided by me. Each locomotive is provided with a laterally-movable arm 30, having a roller 31 thereon, and when in its normal position this roller will ride along the rail 24' and depress it as the locomotive passes thereover. This depression of rail 24' will cause the actuation of rods 28, 24, and 21 by bell-crank levers 27, 23, and 22, and the rod 21 will pull the rails 1 1 toward the casing 5. It will be understood, however, that the arm 13 is locked against movement, and therefore cannot swing in the manner hereinbefore described. As a result the pressure of stem 3 against locking-lever 7 will cause said lever to press the casing 5 toward the arm 13 until the recessed end 18 comes into contact with said arm, as shown in Fig. 5, whereupon the stationary stem 11 will force the locking-lever 7 to swing upon its fulcrum and out of the path of the head 6. The continued movement of the rails 1 1 toward the casing 5 will force the head 6 into engagement with the spring-catch 20, and the shifted rails 1 1 will therefore be securely locked. Should it be desired to return the rails 1 1 to their initial positions, a key must be inserted in the keyhole 32, formed in the top of the casing, and by means of this key the spring-catch 20 can be released from engagement with head 6, and while held in such position handle 15 can be unlocked and the parts moved into the position shown in Fig. 6. It will of course be understood that as the casing is pulled with the arm 13 the heads 6 and 10 will be moved apart, so as to permit the locking-lever 7 to swing into position therebetween, and after the parts have assumed the positions as shown in Fig. 6 they can be returned to their original positions, such as shown in Figs. 1 and 3, in the manner hereinbefore described.

It will be understood that this apparatus is distinctly a safety mechanism, whereby a switch can be automatically closed and locked, and it is to be used to automatically shift the switch in either direction. It, however, does not interfere with the ordinary manual shifting of the switch, as will be understood from the foregoing description.

The roller 31 is so mounted upon the locomotive that the same can be swung laterally, so as not to actuate the rail 24', if it is desired to move onto a siding; but the normal position of the roller 31 is such as to depress rail 24', and therefore if any switch is carelessly left open the same will be automatically closed, whether or not the engineer has knowledge of it.

Having thus fully described my invention, what I claim as new, and desire to secure by Letters Patent, is—

1. The combination with movable switch-rails and a swinging arm for actuating the rails; of a headed stem pivotally connected to the rails, a headed stem pivotally connected to the arm, a casing slidably mounted on the stems, a locking-lever pivoted within the casing and normally interposed between the heads, and a catch for automatically engaging one of the heads.

2. The combination with movable switch-rails and means for automatically actuating them; of a swinging arm, a headed stem pivoted thereto, a headed stem connected to the rails, a casing slidably mounted upon both stems, a locking device within the casing and interposed between the heads, said device adapted to automatically withdraw from between the heads when the stems are pressed toward each other, and means for automatically locking one of the stems within the casing.

3. The combination with movable switch-rails and means for automatically actuating them; of a manually-operated arm, a headed stem extending therefrom, a headed stem connected to the rails, a casing slidably mounted upon both of the stems, a spring-pressed locking-lever interposed between the stems and adapted to automatically withdraw therefrom when the stems are pressed toward each other, and a lock for automatically engaging one of the stems within the casing.

4. In a switch, the combination with movable rails and means for automatically shifting said rails; of a manually-operated arm having a curved extension at one end, a stem pivoted to said arm, a stem connected to the rails, a casing slidably mounted on the stems, said casing having a recessed portion normally spaced from the arm and adapted to contact with the curved extension thereon, means for limiting the movement of each stem in one direction within the casing, a locking device within the casing interposed between the stems to hold them spaced apart, and a lock within the casing for automatically engaging one of the stems when released from the locking device.

5. The combination with movable switch-rails, a depressible rail and mechanism operated by the depression of the rail for actuating the switch-rails; of a headed stem connected to the switch-rails, a casing slidably mounted upon the stem, a spring-pressed locking-lever pivoted within the casing and normally engaging one end of the stem and holding it against movement, and means operated by the longitudinal movement of the stem and casing for withdrawing the locking-lever from the path of the stem.

6. The combination with movable switch-rails, a depressible rail and mechanism operated by the depression of the rail for actuating the switch-rails; of a headed stem connected to the switch-rails, a casing slidably mounted upon the stem, a spring-pressed locking-lever pivoted within the casing and normally engaging one end of the stem and holding it against movement, means operated by the longitudinal movement of the stem and casing for withdrawing the locking-lever from the path of the stem, and a spring-catch within the casing for automatically engaging the stem when projected into the casing.

7. The combination with switch-rails, a depressible rail, and mechanism actuated by the depression of the rail for actuating the switch-rails; of a manually-movable arm, a stem pivoted to and extending from the arm, a stem pivoted to the switch-rails, a casing slidably mounted on the stems, a spring-pressed locking-lever normally interposed between the stems and within the casing, said lever adapted to be automatically withdrawn from between the stems when the stems are pressed toward each other, and a spring-catch for automatically engaging and locking one of the stems within the casing.

In testimony whereof I have signed my name to this specification in the presence of two subscribing witnesses.

HARRY RAYMOND.

Witnesses:
   JAMES JENSEN,
   CHRIST ZIMMERMAN